US012641503B2

(12) United States Patent　　　(10) Patent No.:　US 12,641,503 B2
Chandrashekar et al.　　　　　　 (45) Date of Patent:　　May 26, 2026

(54) BI-LAYERED MOBILITY FOR NG-RAN

(71) Applicant: Nokia Technologies Oy, Espoo (FI)

(72) Inventors: Subramanya Chandrashekar,
Bangalore (IN); Guillaume Decarreau,
Munich (DE); Tero Henttonen, Espoo
(FI); Andres Arjona, Tokyo (JP)

(73) Assignee: Nokia Technologies Oy, Espoo (FI)

( * ) Notice: Subject to any disclaimer, the term of this
patent is extended or adjusted under 35
U.S.C. 154(b) by 311 days.

(21) Appl. No.: 18/559,055

(22) PCT Filed: May 4, 2022

(86) PCT No.: PCT/EP2022/061923
§ 371 (c)(1),
(2) Date: Nov. 5, 2023

(87) PCT Pub. No.: WO2022/233909
PCT Pub. Date: Nov. 10, 2022

(65) Prior Publication Data
US 2024/0236793 A1　　　Jul. 11, 2024

(30) Foreign Application Priority Data

May 5, 2021　(IN) ............................. 202141020500

(51) Int. Cl.
*H04W 36/06*　　　(2009.01)
*H04W 36/00*　　　(2009.01)
(Continued)

(52) U.S. Cl.
CPC ....... *H04W 36/06* (2013.01); *H04W 36/0058*
(2018.08); *H04W 36/0061* (2013.01);
(Continued)

(58) Field of Classification Search
None
See application file for complete search history.

(56) References Cited

U.S. PATENT DOCUMENTS 9,232,449 B2 * 1/2016 Lim ................. H04W 36/00835
9,462,529 B2 * 10/2016 Siomina ................ H04W 36/08
(Continued)

FOREIGN PATENT DOCUMENTS

WO　　2019/244940 A1　12/2019
WO　　2022/038308 A1　　2/2022
WO　　2022/207078 A1　10/2022

OTHER PUBLICATIONS

"3rd Generation Partnership Project; Technical Specification Group
Radio Access Network; NR; Radio Resource Control (RRC) pro-
tocol specification (Release 16)", 3GPP TS 38.331, V16.3.1, Jan.
2021, pp. 1-932.

(Continued)

*Primary Examiner* — Tuan A Tran
(74) *Attorney, Agent, or Firm* — Nokia Technologies Oy

(57)　　　　　　ABSTRACT

Improved techniques of intra and inter distributed unit
mobility include determining, by a user equipment served by
a source cell, whether a target cell belongs to the same
distributed unit as the source cell based on information sent
by the central unit (control plane) after a connection with the
network node has been established. The information sent by
the network node includes, for each cell, a group identifier
identifying the distributed unit with which that cell is
associated. When measurement data provided by the user
equipment indicates readiness for a serving cell change to a
target cell, the user equipment uses the group identifier to
determine whether the target cell belongs to the same
distributed unit as the source cell (intra-distributed unit
mobility scenario) or a different distributed unit as the source
cell (inter-distributed unit mobility scenario).

15 Claims, 14 Drawing Sheets

(51) Int. Cl.
    *H04W 36/08*      (2009.01)
    *H04W 36/32*      (2009.01)
    *H04W 88/08*      (2009.01)

(52) U.S. Cl.
    CPC ....... *H04W 36/087* (2023.05); *H04W 36/324*
              (2023.05); *H04W 88/085* (2013.01)

(56)                References Cited

U.S. PATENT DOCUMENTS

| | | | | |
|---|---|---|---|---|
| 9,736,749 | B2 * | 8/2017 | Matsuo | H04W 36/38 |
| 10,674,414 | B2 * | 6/2020 | Xie | H04W 36/04 |
| 10,727,925 | B2 * | 7/2020 | Wang | H04W 36/0085 |
| 10,750,422 | B2 * | 8/2020 | Peng | H04W 36/0058 |
| 11,039,340 | B2 * | 6/2021 | Pettersson | H04W 24/10 |
| 11,265,780 | B2 * | 3/2022 | Decarreau | H04B 7/0695 |
| 11,405,831 | B2 * | 8/2022 | Matsuo | H04W 36/0061 |
| 11,653,262 | B2 * | 5/2023 | Mok | H04W 24/10 |
| | | | | 370/329 |
| 12,108,281 | B2 * | 10/2024 | Mok | H04W 76/15 |
| 12,244,492 | B2 * | 3/2025 | Ramachandra | H04L 45/42 |
| 12,250,598 | B2 * | 3/2025 | Wang | H04W 48/16 |
| 2009/0197606 | A1 * | 8/2009 | Bergman | H04W 36/38 |
| | | | | 370/331 |
| 2015/0282033 | A1 * | 10/2015 | Lunden | H04W 36/0079 |
| | | | | 455/436 |
| 2019/0082368 | A1 * | 3/2019 | Peng | H04W 36/0072 |
| 2019/0222291 | A1 * | 7/2019 | Wang | H04B 7/0695 |
| 2020/0145886 | A1 * | 5/2020 | Prasad | H04W 36/00835 |
| 2020/0229049 | A1 | 7/2020 | Wu et al. | |
| 2021/0211948 | A1 * | 7/2021 | Matsuo | H04J 11/0069 |
| 2021/0227435 | A1 * | 7/2021 | Hsieh | H04W 36/087 |

OTHER PUBLICATIONS

"3rd Generation Partnership Project; Technical Specification Group Radio Access Network; NG-RAN; F1 application protocol (F1AP) (Release 16)", 3GPP TS 38.473, V16.4.0, Jan. 2021, pp. 1-461.

"3rd Generation Partnership Project; Technical Specification Group Radio Access Network; NG-RAN; Architecture description (Release 16)", 3GPP TS 38.401, V16.4.0, Jan. 2021, pp. 1-78.

"LS on TCI State Update for L1/L2-Centric Inter-Cell Mobility", 3GPP TSG RAN WG1 Meeting #104-e, R1-2102248, RAN1, Jan. 25- Feb. 5, 2021, 3 pages.

"On RAN1 LS (R1-2102248) for L1/L2 centric inter-cell mobility", 3GPP TSG-RAN WG2#113 bis-e, R2-2103823, Agenda: 8.17, Ericsson, Apr. 12-20, 2021, 19 pages.

"L1/L2-centric inter-cell mobility", 3GPP TSG-RAN WG2 Meeting #113 bis electronic, R2-2103866, Agenda: 8.17, Apple, Apr. 12-20, 2021, 7 pages.

"RAN2 impact of L1/L2-centric inter-cell mobility and inter-cell multi-TRP", 3GPP TSG-RAN WG2 Meeting #113bis-e, R2-2104116, Agenda: 8.17, Huawei, Apr. 12-20, 2021, 5 pages.

"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.

"New WID: Further enhancements on MIMO for NR", 3GPP TSG RAN Meeting #86, RP-193133, Agenda: 9.1.1, Samsung, Dec. 9-12, 2019, 5 pages.

"[Draft] LS Reply on TCI State Update for L1/L2-Centric Inter-Cell Mobility", 3GPP TSG-RAN WG2 Meeting #114 electronic, R2-2106315, Samsung, May 19-27, 2021, pp. 1-4.

Invitation to Pay Additional Fees received for corresponding Patent Cooperation Treaty Application No. PCT/EP2022/061923, dated Sep. 6, 2022, 14 pages.

"pCR on mobility aspects to 38.401", 3GPP TSG-RAN3 Meeting # 97bis, R3-174124, Agenda: 10.10.1.6, Huawei, Oct. 9-13, 2017, 5 pages.

"Discussion on Intra-DU Inter-Cell Mobility", 3GPP TSG-RAN WG3 #97, R3-173142, Agenda: 10.10.1.6, CMCC, Aug. 21-25, 2017, 8 pages.

"PCI confusion issue", 3GPP TSG-RAN WG2 #99, R2-1708680, Agenda: 10.2.8, Nokia, Aug. 21-25, 2017, 3 pages.

"Enhancements on Multi-beam Operation", 3GPP TSG-RAN WG1 Meeting #103-e, R1-2009288, Agenda: 8.1.1, Ericsson, Oct. 26-Nov. 13, 2020, 20 pages.

International Search Report and Written Opinion received for corresponding Patent Cooperation Treaty Application No. PCT/EP2022/061923, dated Oct. 27, 2022, 23 pages.

International Search Report and Written Opinion received for corresponding Patent Cooperation Treaty Application No. PCT/IB2022/057134, dated Nov. 10, 2022, 17 pages.

"Discussions on L1/L2-centric inter-cell mobility", 3GPP TSG-RAN WG3 Meeting #112-e, R3-212510, Agenda: 8.1, Huawei, May 17-27, 2021, 4 pages.

"Discussion on L1/L2 Mobility", 3GPP TSG-RAN WG2 Meeting #113-bis-e, R2-2103079, Agenda: 8.17, Qualcomm Incorporated, Apr. 12-20, 2021, 6 pages.

* cited by examiner

Example Wireless Network 130

200

400

| DU ID | DU-PCI | CU-PCIG |
|---|---|---|
| 1 | 1 | A |
| 1 | 2 | A |
| 1 | 3 | A |
| 1 | 4 | A |
| 2 | 5 | B |
| 2 | 6 | B |
| 2 | 7 | B |
| 2 | 8 | B |

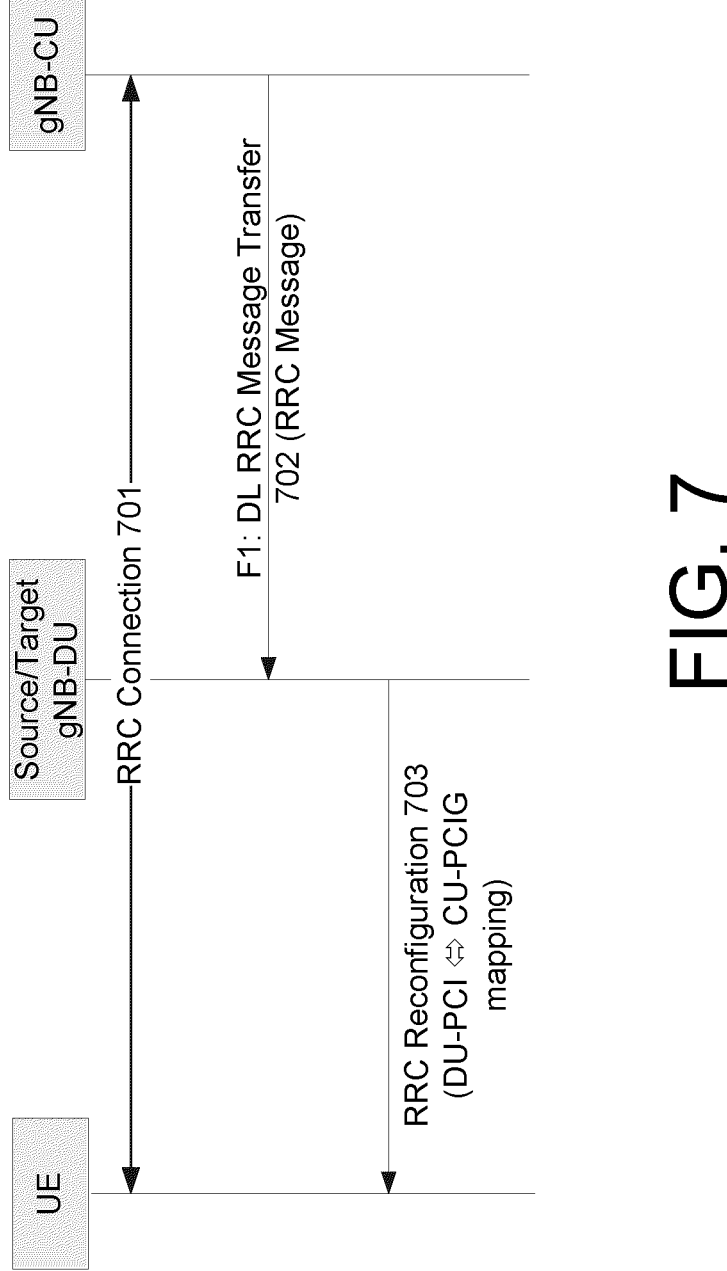
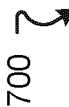
700
FIG. 7

Figure 11:
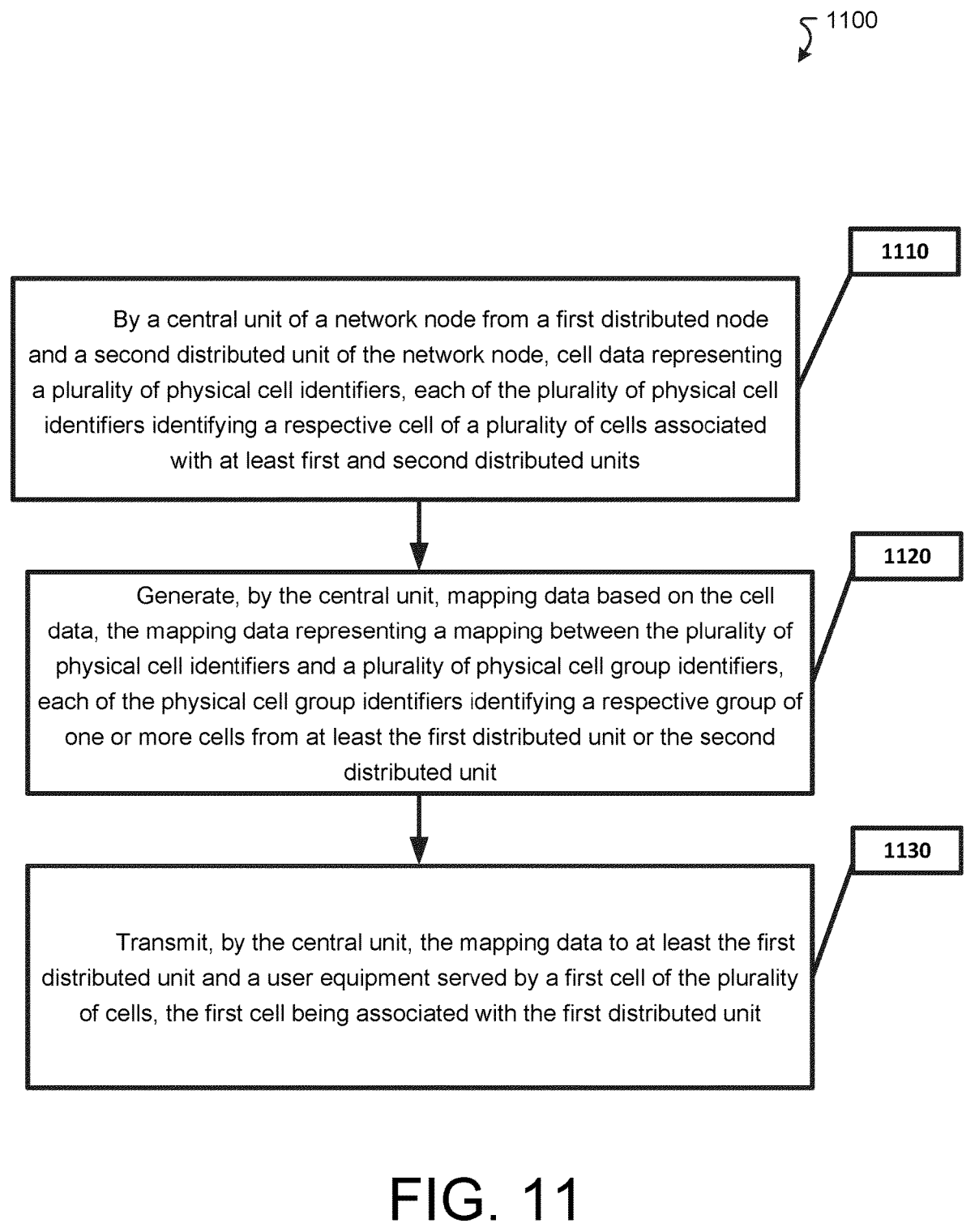

1100

1110

By a central unit of a network node from a first distributed node and a second distributed unit of the network node, cell data representing a plurality of physical cell identifiers, each of the plurality of physical cell identifiers identifying a respective cell of a plurality of cells associated with at least first and second distributed units

1120

Generate, by the central unit, mapping data based on the cell data, the mapping data representing a mapping between the plurality of physical cell identifiers and a plurality of physical cell group identifiers, each of the physical cell group identifiers identifying a respective group of one or more cells from at least the first distributed unit or the second distributed unit

1130

Transmit, by the central unit, the mapping data to at least the first distributed unit and a user equipment served by a first cell of the plurality of cells, the first cell being associated with the first distributed unit

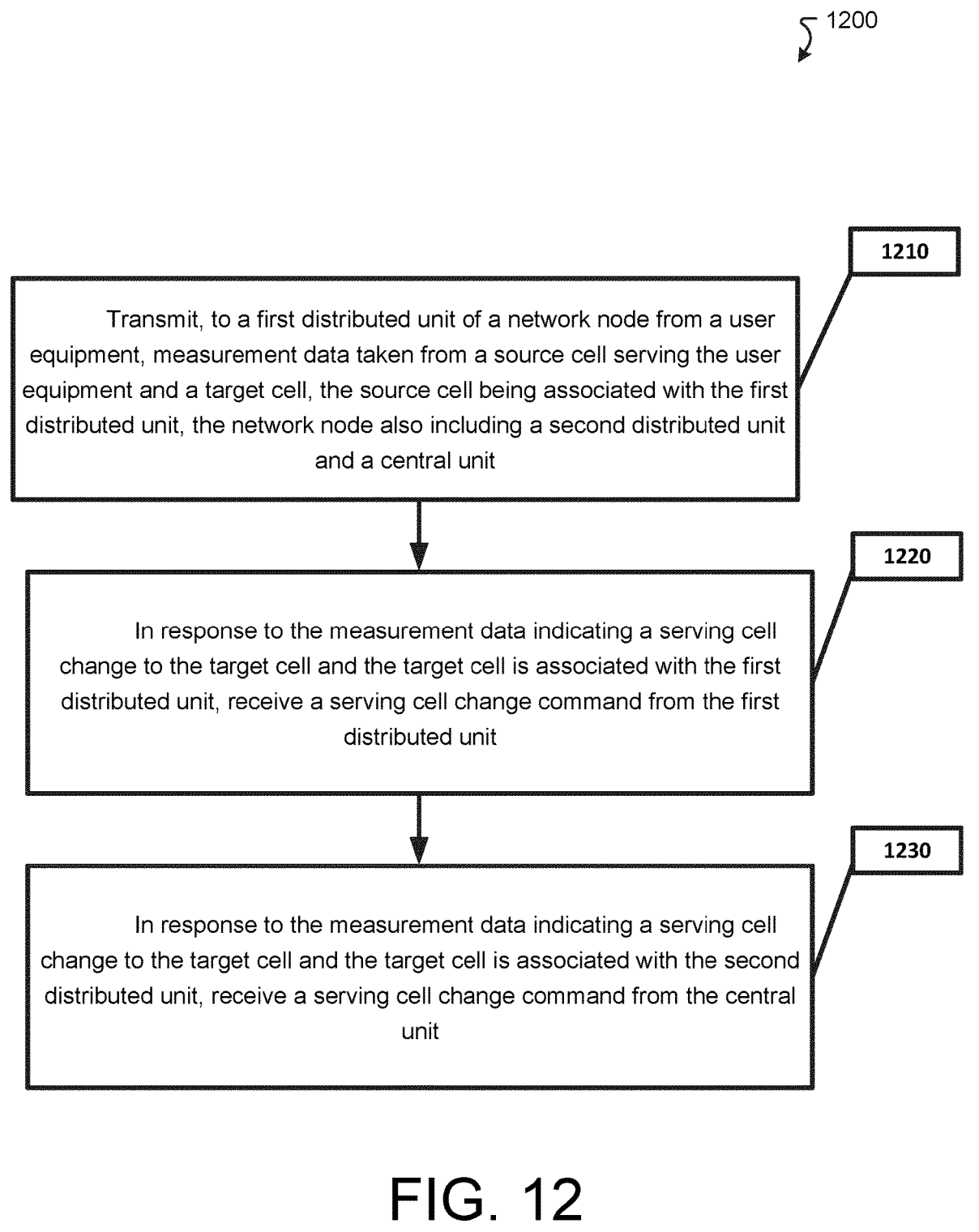

Transmit, to a first distributed unit of a network node from a user equipment, measurement data taken from a source cell serving the user equipment and a target cell, the source cell being associated with the first distributed unit, the network node also including a second distributed unit and a central unit

1220

In response to the measurement data indicating a serving cell change to the target cell and the target cell is associated with the first distributed unit, receive a serving cell change command from the first distributed unit

1230

In response to the measurement data indicating a serving cell change to the target cell and the target cell is associated with the second distributed unit, receive a serving cell change command from the central unit

FIG. 12

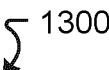
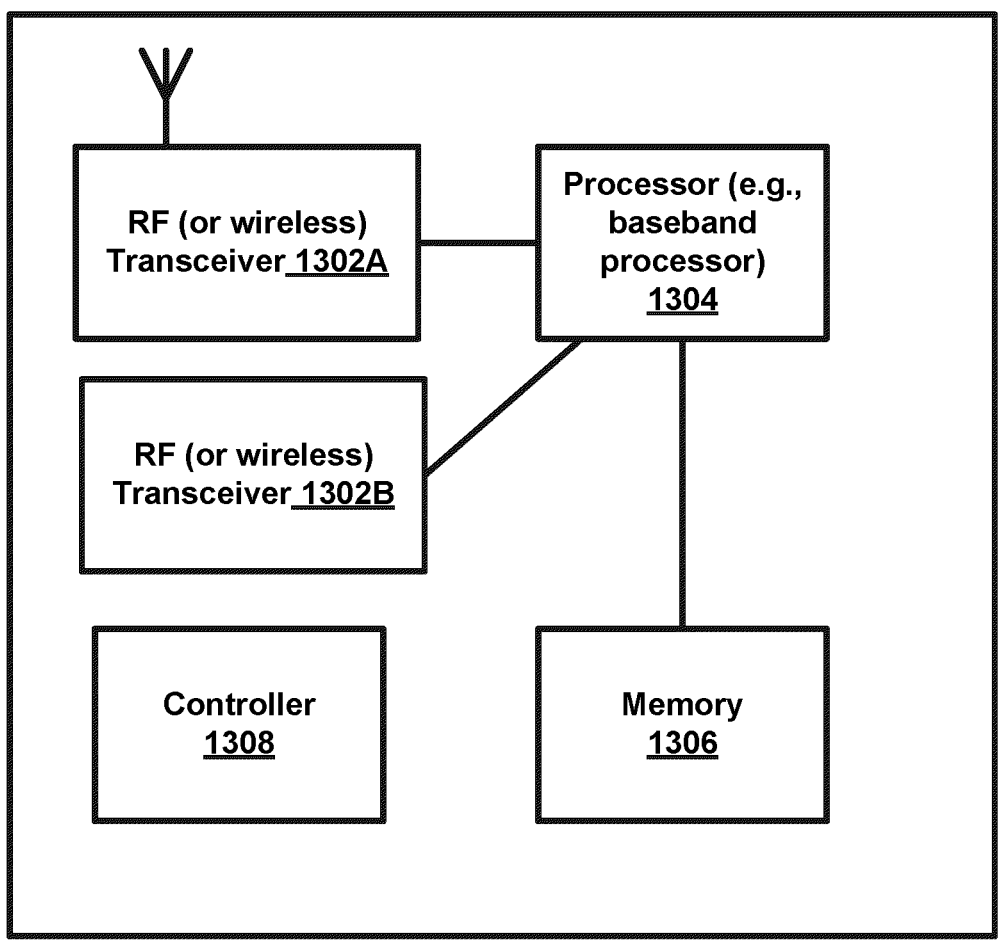
FIG. 13

BI-LAYERED MOBILITY FOR NG-RAN

RELATED APPLICATION

This application was originally filed as PCT Application No. PCT/EP2022/061923, filed on May 4, 2022, which claims priority from IN Application No. 202141020500, filed on May 5, 2021, each of which is incorporated herein by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes receiving, by a first distributed unit of a network node, measurement data from a user equipment served by a source cell associated with the first distributed unit, the network node also including a central unit and a second distributed unit. The method further includes, in response to (i) determining conditions for a serving cell change of the user equipment from the source cell to a target cell have been satisfied based on the measurement data and (ii) the target cell is also associated with the first distributed unit, performing, by the first distributed unit, the serving cell change of the user equipment from the source cell to the target cell. The method further includes, in response to (i) determining conditions for a serving cell change from the source cell to the target cell have been satisfied based on the measurement data and (ii) the target cell is associated with the second distributed unit, transmitting, by the first distributed unit, the measurement data to the central unit so that the central unit may perform the serving cell change.

According to an example implementation, an apparatus includes at least one processor and at least one memory including computer program code, the at least one memory and the computer program code configured to, with the at least one processor, cause the apparatus at least to receive, by a first distributed unit of a network node, measurement data from a user equipment served by a source cell associated with the first distributed unit, the network node also including a second distributed unit and a central unit. The at least one memory and the computer program code are further configured to, with the at least one processor, cause the apparatus at least to, in response to (i) determining conditions for a serving cell change of the user equipment from the source cell to a target cell have been satisfied based on the measurement data and (ii) the target cell is also associated with the first distributed unit, perform, by the first distributed unit, the serving cell change of the user equipment from the source cell to the target cell. The at least one memory and the computer program code are further configured to, with the at least one processor, cause the apparatus at least to in response to (i) determining conditions for a serving cell change from the source cell to the target cell have been satisfied based on the measurement data and (ii) the target cell is associated with the second distributed unit, transmit the measurement data to the central unit so that the central unit may perform the serving cell change.

According to an example implementation, an apparatus includes means for receiving, by a first distributed unit of a network node, measurement data from a user equipment served by a source cell associated with the first distributed unit, the network node also including a central unit and a second distributed unit. The apparatus also includes means for, in response to (i) determining conditions for a serving cell change of the user equipment from the source cell to a target cell have been satisfied based on the measurement data and (ii) the target cell is also associated with the first distributed unit, performing, by the first distributed unit, the serving cell change of the user equipment from the source cell to the target cell. The apparatus further includes, in response to (i) determining conditions for a serving cell change from the source cell to the target cell have been satisfied based on the measurement data and (ii) the target cell is associated with the second distributed unit, transmitting, by the first distributed unit, the measurement data to the central unit so that the central unit may perform the serving cell change.

According to an example implementation, a computer program product includes a computer-readable storage medium and storing executable code that, when executed by at least one data processing apparatus, is configured to cause the at least one data processing apparatus to receive, by a first distributed unit of a network node, measurement data from a user equipment served by a source cell associated with the first distributed unit, the network node also including a second distributed unit and a central unit. The executable code, when executed by at least one data processing apparatus, is also configured to cause the at least one data processing apparatus to, in response to (i) determining conditions for a serving cell change of the user equipment from the source cell to a target cell have been satisfied based on the measurement data and (ii) the target cell is also associated with the first distributed unit, perform, by the first distributed unit, the serving cell change of the user equipment from the source cell to the target cell. The executable code, when executed by at least one data processing apparatus, is also configured to cause the at least one data processing apparatus to, in response to (i) determining conditions for a serving cell change from the source cell to the target cell have been satisfied based on the measurement data and (ii) the target cell is associated with the second distributed unit, transmit the measurement data to the central unit so that the central unit may perform the serving cell change.

According to an example implementation, a method includes receiving, by a central unit of a network node from a first distributed node and a second distributed unit of the network node, cell data representing a plurality of physical cell identifiers, the network node also including a central unit and a second distributed unit, the physical cell identifiers identifying a plurality of cells associated with at least first and second distributed unit. The method further includes generating, by the central unit, mapping data based on the cell data, the mapping data representing a mapping between the plurality of physical cell identifiers and a plurality of physical cell group identifiers, the physical cell group identifiers identifying the first distributed unit and the second distributed unit. The method further includes transmitting, by the central unit, the mapping data to the first distributed unit and a user equipment served by a first cell of the plurality of cells, the first cell being associated with the first distributed unit.

According to an example implementation, an apparatus includes at least one processor and at least one memory including computer program code, the at least one memory and the computer program code configured to, with the at least one processor, cause the apparatus at least to receive, by a central unit of a network node from a first distributed node and a second distributed unit of the network node, cell data representing a plurality of physical cell identifiers, the network node also including a central unit and a second distributed unit, each of the plurality of physical cell identifiers identifying a respective cell of a plurality of cells associated with at least first and second distributed unit. The at least one memory and the computer program code are further configured to generate, by the central unit, mapping data based on the cell data, the mapping data representing a mapping between the plurality of physical cell identifiers and a plurality of physical cell group identifiers, each of the physical cell group identifiers identifying a respective group of one or more cells from at least the first distributed unit or the second distributed unit. The at least one memory and the computer program code are further configured to transmit, by the central unit, the mapping data to at least the first distributed unit and a user equipment served by a first cell of the plurality of cells, the first cell being associated with the first distributed unit.

According to an example implementation, an apparatus includes means for receiving, by a central unit of a network node from a first distributed node and a second distributed unit of the network node, cell data representing a plurality of physical cell identifiers, the network node also including a central unit and a second distributed unit, the physical cell identifiers identifying a plurality of cells associated with at least first and second distributed unit. The apparatus also includes means for generating, by the central unit, mapping data based on the cell data, the mapping data representing a mapping between the plurality of physical cell identifiers and a plurality of physical cell group identifiers, the physical cell group identifiers identifying the first distributed unit and the second distributed unit. The apparatus further includes means for transmitting, by the central unit, the mapping data to the first distributed unit and a user equipment served by a first cell of the plurality of cells, the first cell being associated with the first distributed unit.

According to an example implementation, a computer program product includes a computer-readable storage medium and storing executable code that, when executed by at least one data processing apparatus, is configured to cause the at least one data processing apparatus to receive, by a central unit of a network node from a first distributed node and a second distributed unit of the network node, cell data representing a plurality of physical cell identifiers, the network node also including a central unit and a second distributed unit, each of the plurality of physical cell identifiers identifying a respective cell of a plurality of cells associated with at least first and second distributed units. The executable code, when executed by at least one data processing apparatus, is also configured to cause the at least one data processing apparatus to generate, by the central unit, mapping data based on the cell data, the mapping data representing a mapping between the plurality of physical cell identifiers and a plurality of physical cell group identifiers, each of the physical cell group identifiers identifying a respective group of one or more cells from at least the first distributed unit or the second distributed unit. The executable code, when executed by at least one data processing apparatus, is also configured to cause the at least one data processing apparatus to transmit, by the central unit, the mapping data to at least the first distributed unit and a user equipment served by a first cell of the plurality of cells, the first cell being associated with the first distributed unit.

According to an example implementation, a method includes transmitting, to a first distributed unit of a network node from a user equipment, measurement data taken from a source cell serving the user equipment and a target cell, the source cell being associated with the first distributed unit, the network node also including a second distributed unit and a central unit. The method further includes, in response to the measurement data indicating a serving cell change to the target cell and the target cell is associated with the first distributed unit, receiving a serving cell change command from the first distributed unit. The method further includes, in response to the measurement data indicating a serving cell change to the target cell and the target cell is associated with the second distributed unit, receiving a serving cell change command from the central unit.

According to an example implementation, an apparatus includes at least one processor and at least one memory including computer program code, the at least one memory and the computer program code configured to, with the at least one processor, cause the apparatus at least to transmit, to a first distributed unit of a network node from a user equipment, measurement data taken from a source cell serving the user equipment and a target cell, the source cell being associated with the first distributed unit, the network node also including a second distributed unit and a central unit. The at least one memory and the computer program code are further configured to, in response to the measurement data indicating a serving cell change to the target cell and the target cell is associated with the first distributed unit, receive a serving cell change command from the first distributed unit. The at least one memory and the computer program code are further configured to, in response to the measurement data indicating a serving cell change to the target cell and the target cell is associated with the second distributed unit, receive a serving cell change command from the central unit.

According to an example implementation, an apparatus includes means for transmitting, to a first distributed unit of a network node from a user equipment, measurement data taken from a source cell serving the user equipment and a target cell, the source cell being associated with the first distributed unit, the network node also including a second distributed unit and a central unit. The apparatus also includes means for, in response to the measurement data indicating a serving cell change to the target cell and the target cell is associated with the first distributed unit, receiving a serving cell change command from the first distributed unit. The apparatus further includes means for, in response to the measurement data indicating a serving cell change to the target cell and the target cell is associated with the second distributed unit, receiving a serving cell change command from the central unit.

According to an example implementation, a computer program product includes a computer-readable storage medium and storing executable code that, when executed by at least one data processing apparatus, is configured to cause the at least one data processing apparatus to transmit, to a first distributed unit of a network node from a user equipment, measurement data taken from a source cell serving the user equipment and a target cell, the source cell being associated with the first distributed unit, the network node also including a second distributed unit and a central unit. The executable code, when executed by at least one data processing apparatus, is also configured to cause the at least one data processing apparatus to, in response to the measurement data indicating a serving cell change to the target cell and the target cell is associated with the first distributed unit, receive a serving cell change command from the first distributed unit. The executable code, when executed by at least one data processing apparatus, is also configured to cause the at least one data processing apparatus to, in response to the measurement data indicating a serving cell change to the target cell and the target cell is associated with the second distributed unit, receive a serving cell change command from the central unit.

The details of one or more examples of implementations are set forth in the accompanying drawings and the description below. Other features will be apparent from the description and drawings, and from the claims.

BRIEF DESCRIPTION OF THE DRAWINGS

FIG. 4 is a table illustrating an association of DU-PCI with CU-PCIG according to an example implementation.

FIG. 7 is a sequence diagram illustrating a configuration of a mapping to a UE according to an example implementation.

FIG. 11 is a flow chart illustrating a bi-layered mobility process according to an example implementation.

FIG. 12 is a flow chart illustrating a bi-layered mobility process according to an example implementation.

FIG. 13 is a block diagram of a node or wireless station (e.g., base station/access point, relay node, or mobile station/user device) according to an example implementation.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Figure 1:
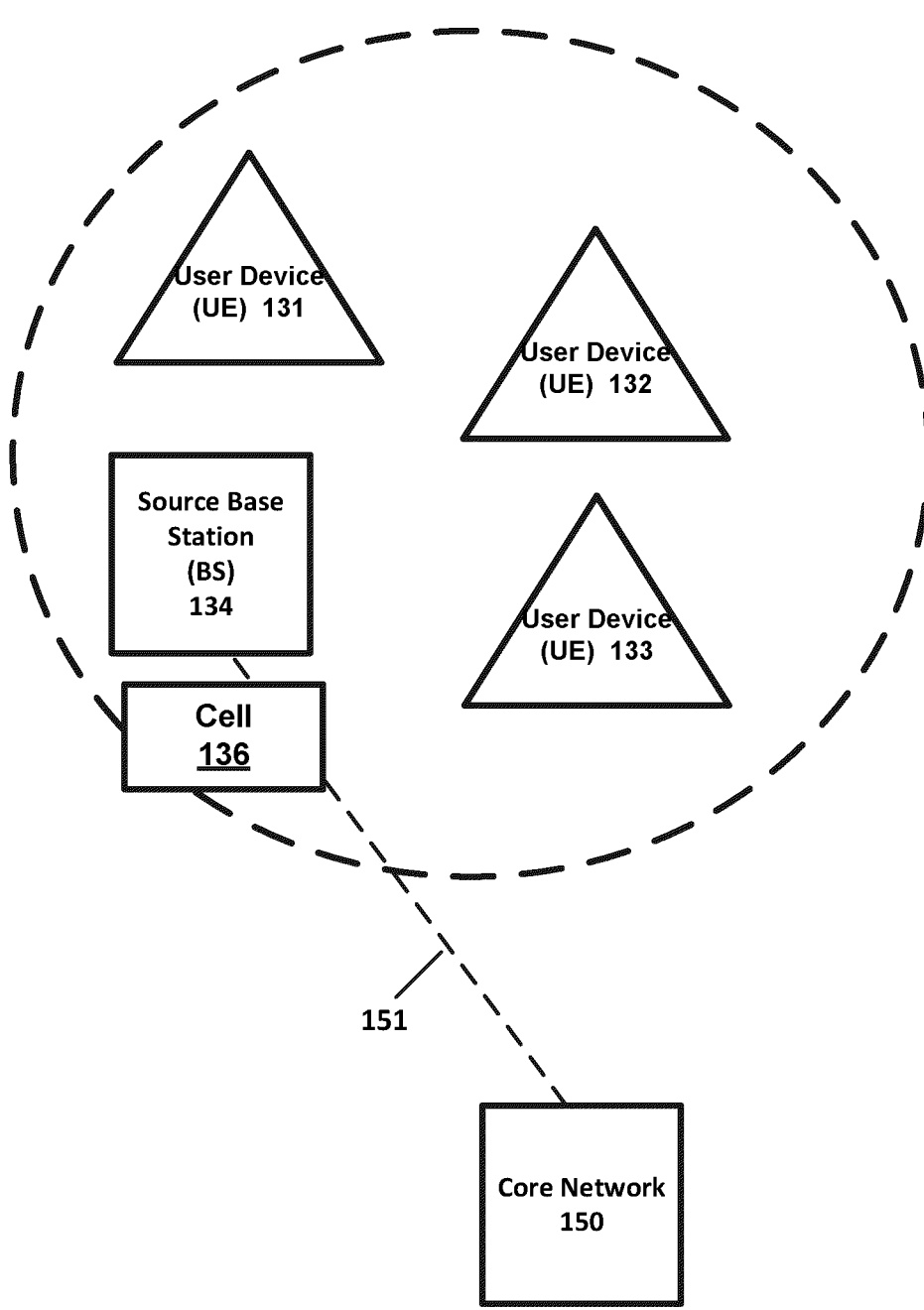
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, and 133, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including the user devices 131, 132 and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/serving cell change of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

Figure 2:
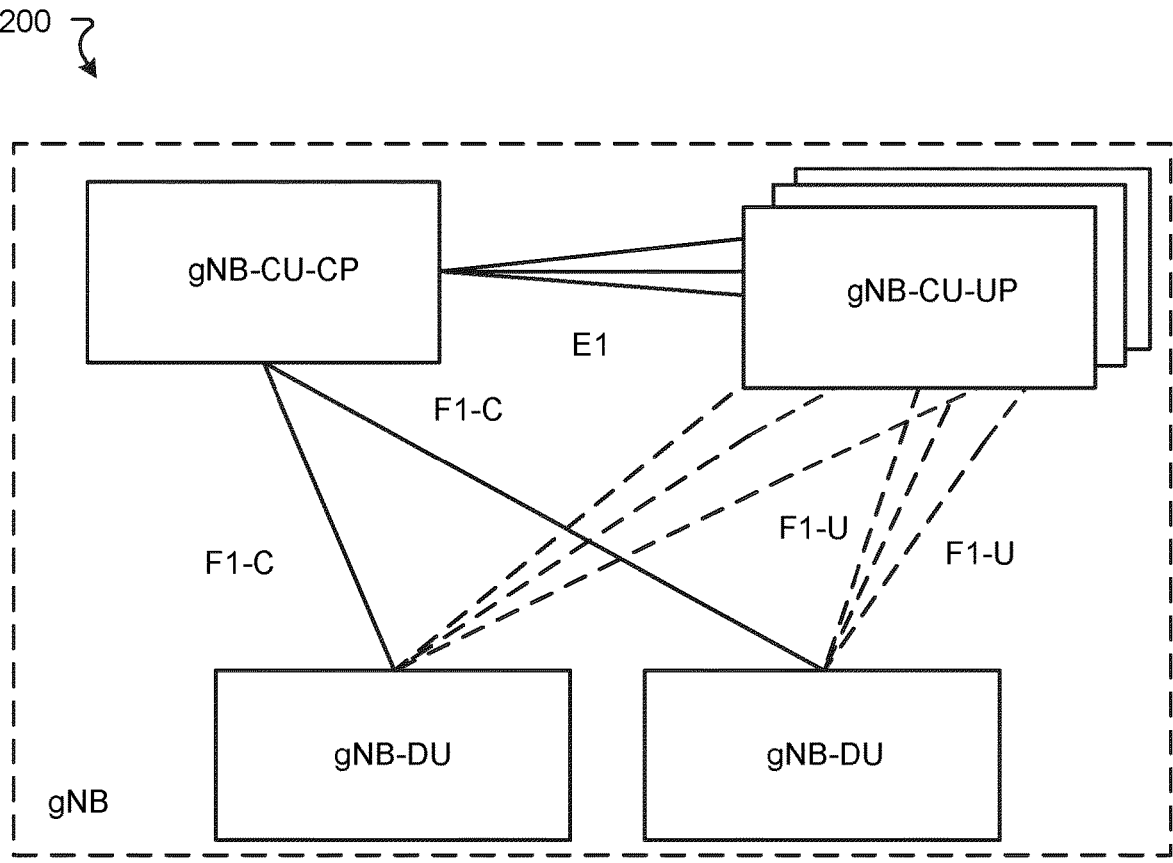
FIG. 2 is a diagram illustrating a disaggregated gNB architecture according to an example implementation.

A disaggregated architecture is defined in the 3GPP standard as a decomposition of a network node (gNB) into multiple logical entities. FIG. 2 illustrates such an architecture 200, in which a gNB has a central unit (gNB-CU) and distributed units (gNB-DUs). As shown in FIG. 2, the gNB-CU itself is split into a control plane component (gNB-CU-CP) and a user plane component (gNB-CU-UP). The gNB-CU-CP is connected to the gNB-CU-UP via an E1 connection, the gNB-DUs are connected to the gNB-CU-CP via a F1-C connection, and the gNB-DUs are connected to the gNB-CU-UP via a F1-U connection.

Figure 3A:
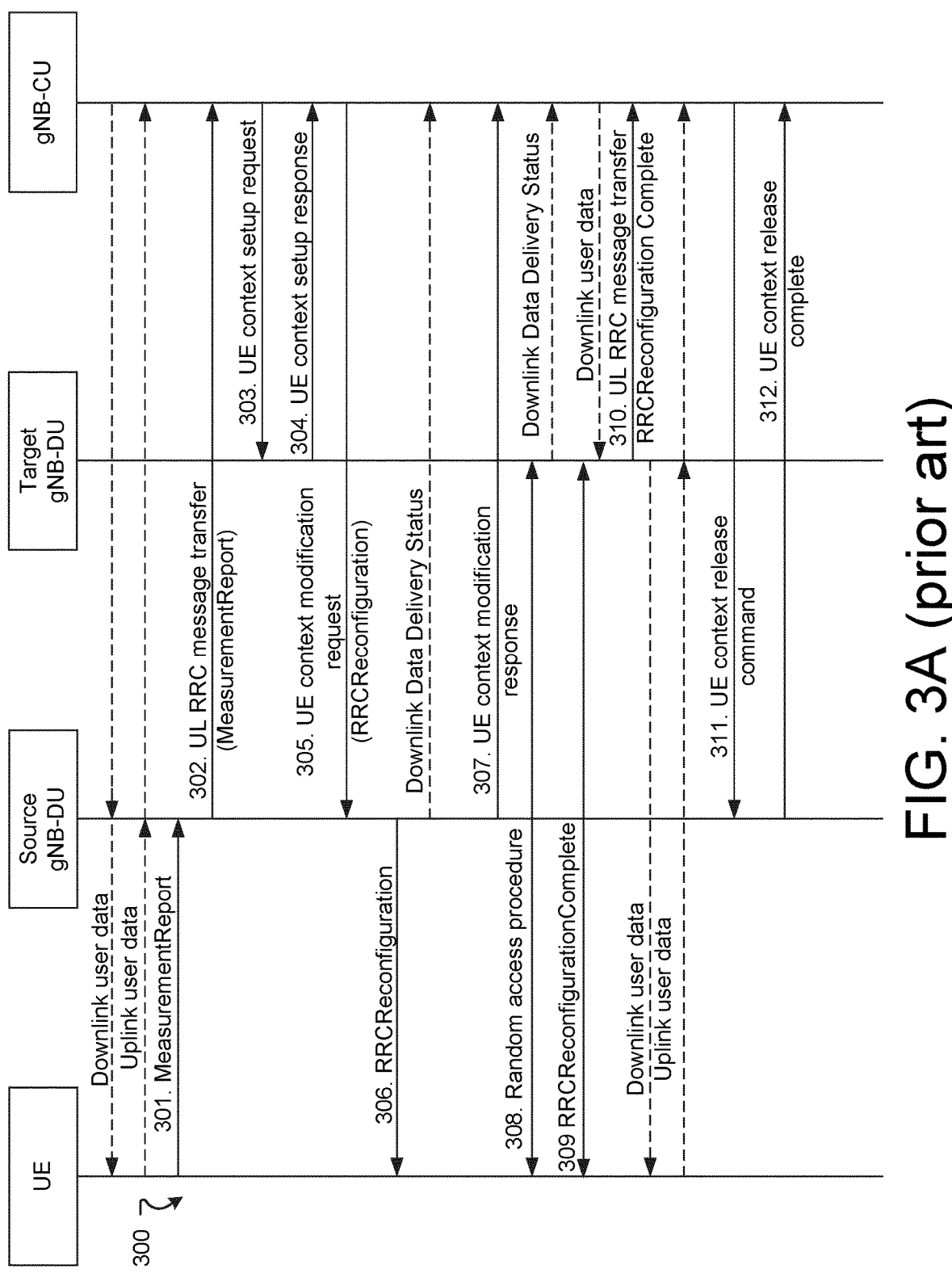
FIG. 3A is a sequence diagram illustrating inter-gNB-DU mobility signaling, according to an example implementation.
Figure 3B:
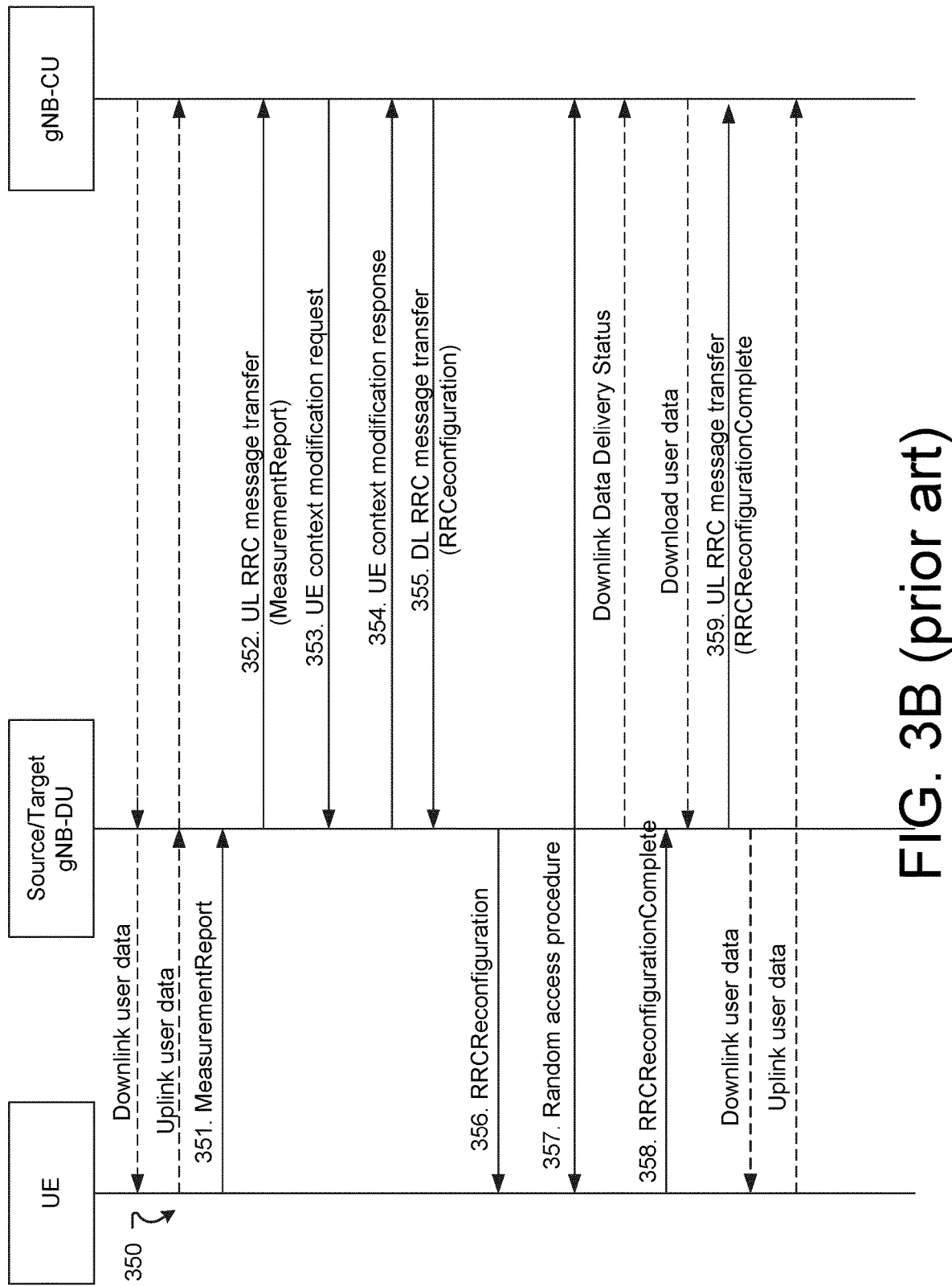
FIG. 3B is a sequence diagram illustrating intra-gNB-DU mobility signaling, according to an example implementation.

In such a disaggregated architecture as that shown in FIG. 2, a gNB-DU may host multiple cells up to a maximum of 512 according to current specifications. Accordingly, serving cell change between cells may be considered intra-DU for a serving cell change between cells of the same gNB-DU, and inter-DU between cells of different gNB-DUs. FIG. 3A illustrates an example of signaling for conventional intra-DU mobility 300; FIG. 3B illustrates an example of signaling for inter-DU mobility 350.

In conventional approaches to mobility events shown in FIGS. 3 and 4, a user equipment (UE) reports layer 1 (L1) and layer 3 (L3) measurements to the gNB-DU and gNB-CU, respectively. L1 beam measurements are reported to MAC layer and used for beam management in the gNB-DU, and are not forwarded to the gNB-CU. In contrast, L3 measurements (i.e., cell measurements including optional beam measurements) are reported using RRC protocol and used for mobility management. The L3 measurements are forwarded to the gNB-CU by the gNB-DU.

Beam changes are managed by DU and cell changes, regardless of whether the mobility is intra-DU or inter-DU, are triggered/managed by the gNB-CU-CP.

In conventional approaches to intra and inter gNB-DU mobility, the gNB-CU-CP determines the triggering of mobility procedure based on received L3 measurements. For intra-DU cell changes, this incurs additional time, particularly in a distributed cloud deployment where there is an external F1/E1 interface. For instance after UE sends the measurement report at 301 of FIG. 3A, the measurements have to be forwarded to the CU-CP (302) which will then request and perform the UE context modification at the target cell which belongs to the same DU (303 and 304), and send an RRCReconfiguration (serving cell change command) to the UE via the DU (305). Only at 306, DU is able to forward the serving cell change command to the UE.

In contrast to the above-described conventional approaches to intra and inter gNB-DU mobility, improved techniques of intra and inter gNB-DU mobility include determining, by a UE served by a source cell, whether a target cell belongs to the same gNB-DU as the source cell based on information sent by the gNB-CU-CP after a connection with the gNB has been established. The information sent by the gNB includes, for each cell, a group identifier identifying the gNB-DU with which that cell is associated. When measurement data provided by the UE indicates readiness for a serving cell change to a target cell, the UE uses the group identifier to determine whether the target cell belongs to the same gNB-DU as the source cell (intra-DU mobility scenario) or a different gNB-DU as the source cell (inter-DU mobility scenario).

Advantageously, the above-described improved technique for intra and inter gNB-DU mobility provides for more efficient serving cell change between cells belonging to the same gNB-DU. The gNB-CU is not burdened with intra-DU mobility and accordingly is saved those computing resources.

According to example implementation, the serving cell change effected by the apparatus is a handover, SCell change or establishment of dual- or multi-connectivity operation.

FIG. 4 is a table 400 illustrating an association of DU-PCI with CU-PCIG. The table 400 has columns corresponding to a gNB-DU identifier, a DU-PCI which identifies a cell, and a CU-PCIG which identifies a group of cells belonging to a gNB-DU. The table 400, then, enables the UE and/or a gNB-DU to identify a cell with a gNB-DU. This in turn enables the gNB to save computational resources by tasking the gNB-DU to handle intra-gNB-DU mobility. For example, when a UE is being served by a source cell having a DU-PCI of 2 and RSRP measurements indicate a serving cell change event to the target cell having a DU-PCI of 4, the UE will only communicate with its gNB-DU, and not the gNB-CU, to effect the serving cell change. If, in contrast, the target cell has a DU-PCI of 5, then table 400 indicates that the serving cell change will be inter-DU and handled by the gNB-CU. Note that, in intra-DU mobility, the gNB-CU is never notified of a serving cell change taking place between cells.

The result of the above-described split of intra-DU and inter-DU mobility is referred to as "bi-layered mobility." In summary:

Mobility events for a target cell in the same gNB-DU as the source cell are triggered/handled at the gNB-DU, and Mobility events for a target cell in a different gNB-DU from the source cell are triggered/handled at the gNB-CU-CP.

Accordingly, the intra-gNB-DU (i.e. source and target cell are in the same gNB-DU) cell/beam changes are kept completely transparent to a gNB-CU control plane (gNB-CU-CP).

To sum:

The DU-PCIs of a given gNB-DU are associated (i.e. grouped) under a common PCI per DU, which is called CU-PCIG.

The cell DU-PCI determines the UE presence at cell level, while the CU-PCIG determines the UE presence at DU level.

The DU-PCI is allocated by the DU and any conflict is resolved by the CU-CP.

Figure 5:
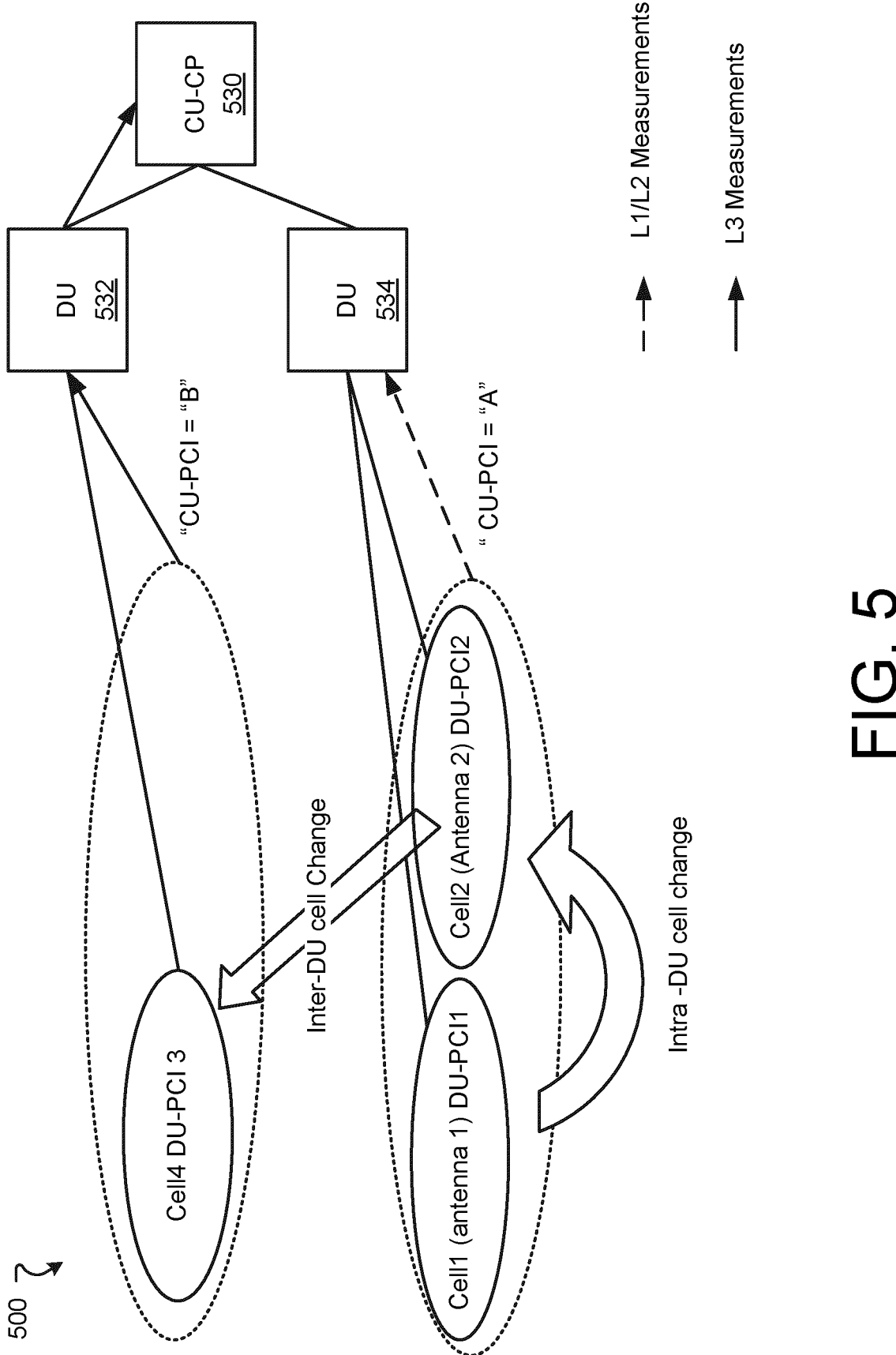
FIG. 5 is a diagram illustrating cell change in a bi-layered mobility structure according to an example implementation.

FIG. 5 is a diagram illustrating cell change in a bi-layered mobility structure 500. As shown in FIG. 5, the structure 500 includes a network node having a gNB-CU-CP 530 with which gNB-DUs 532 and 534 are associated. Cell4, having a DU-PCI of 3, is associated with gNB-DU 532 having a CU-PCIG "B,", and Cell1 and Cell2, with respective DU-PCIs of 1 and 2, are associated with gNB-DU 534 having a CU-PCIG of "A."

As shown in FIG. 5, when there is an intra-DU cell change, i.e., between Cell1 and Cell2, the UE served by the source cell (e.g., Cell2) sends layer 1 (L1) measurements to its gNB-DU, i.e., gNB-DU 534, as both Cell1 and Cell2 have a CU-PCI of "A." In contrast, when the target cell is Cell4, having a CU-PCI of "B" and associated with gNB-DU 532, the UE sends layer 3 (L3) measurements to the gNB-CU-CP via its gNB-DU.

Figure 6:
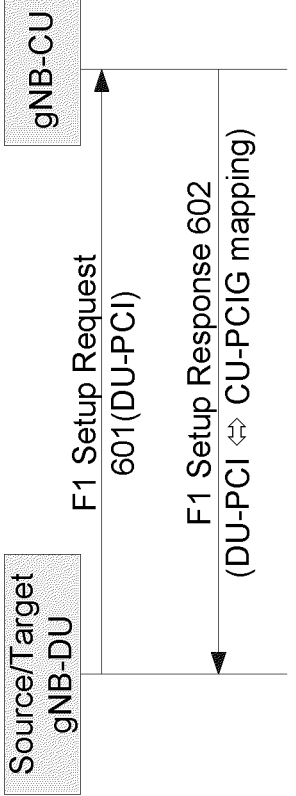
FIG. 6 is a sequence diagram illustrating an initial mapping exchange during F1 setup according to an example implementation.

FIG. 6 is a sequence diagram illustrating an initial mapping exchange 600 during F1 setup. At 601, the gNB-DU informs the gNB-CU-CP of its constituent cell DU-PCIs during the F1 setup. In some implementations, the gNB-DU may send the DU-PCIs during configuration update procedures. At 602, the gNB-DU in return receives the mapped CU-PCIG (i.e., CU-PCI) from the gNB-CU-CP.

FIG. 7 is a sequence diagram illustrating a configuration 700 of a mapping to a UE. At 701, a RRC connection between the UE and the gNB-CU is established. At 702, the gNB-CU sends a DL RRC message to each of the source and target gNB-DUs containing the mapping (e.g, table 400 of FIG. 4). At 703, the source gNB-DU sends an RRC Reconfiguration message containing the mapping to the UE.

Figure 8:
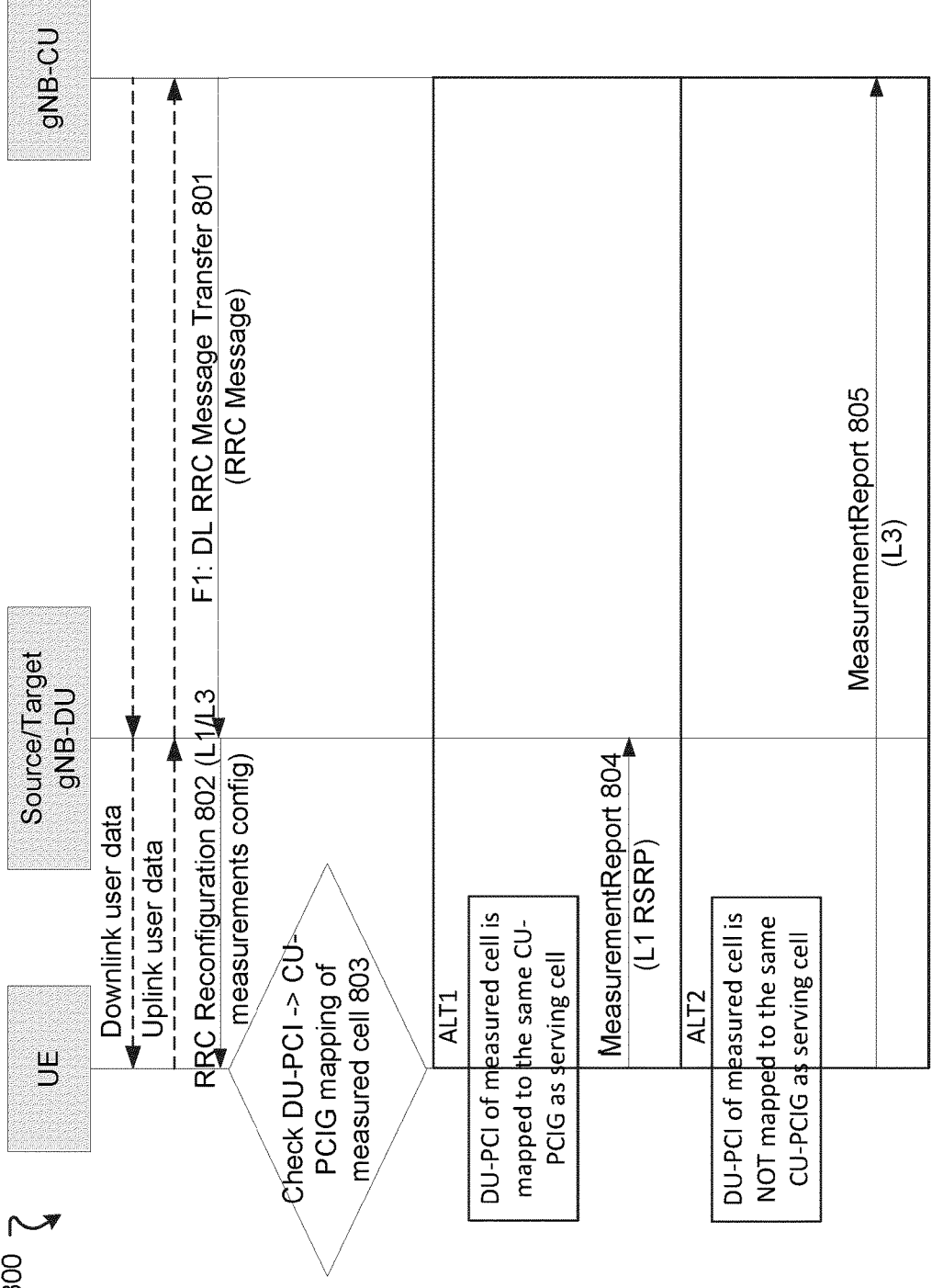
FIG. 8 is a sequence diagram illustrating a measurement configuration and reporting according to an example implementation.

FIG. 8 is a sequence diagram illustrating a measurement configuration and reporting 800 according to an example implementation. As shown in FIG. 8, DL user data flows from the gNB-CU to the source gNB-DU to the UE, while UL user data flows from the UE to the source gNB-DU to the gNB-CU. The UE is served by a source cell associated with the source gNB-DU.

At 801, the gNB-CU sends a DL RRC message to the source gNB-DU containing the mapping (e.g, table 400 of FIG. 4).

At 802, the gNB-DU sends a RRC Reconfiguration message based on the L1/L3 measurement configuration from the gNB-DU, the message including DU-PCI of a target cell.

At 803, the UE checks the mapping between the DU-PCI and the CU-PCIG of the target cell.

At 804, the DU-PCI of the target cell is mapped to the same CU-PCIG of the source cell. In this case, the UE sends a report of L1 measurements of a reference signal received power (RSRP) to the source gNB-DU. The gNB-CU is not involved in any serving cell change between the source and target cells.

At 805, the DU-PCI of the target cell is not mapped to the same CU-PCIG of the source cell. In this case, the UE sends a report of L3 measurements of the RSRP to the gNB-CU. The gNB-CU will manage the serving cell change between the source and target cells in this case.

Figure 9:
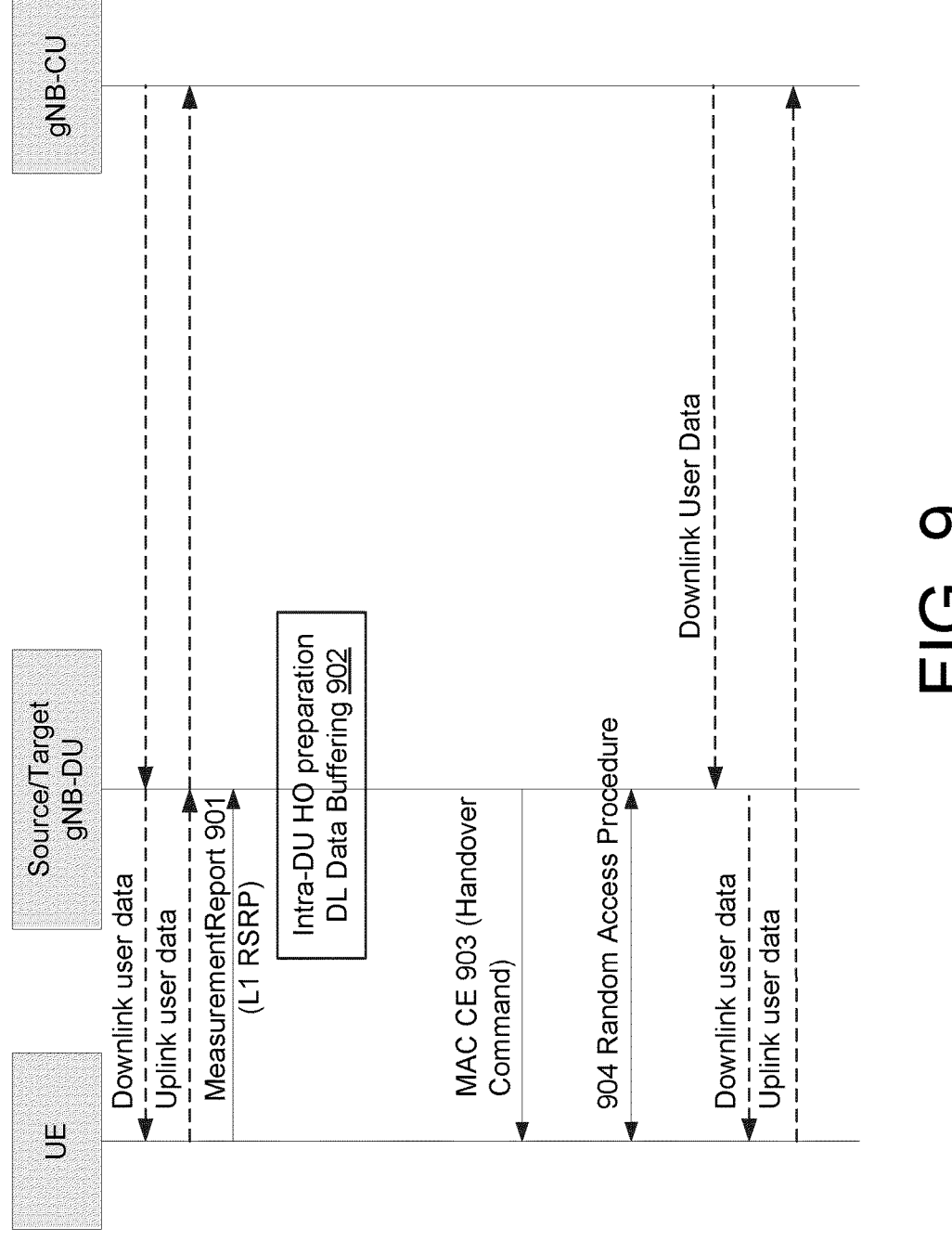
FIG. 9 is a sequence diagram illustrating an intra-DU mobility process according to an example implementation.

FIG. 9 is a sequence diagram illustrating an intra-DU mobility process according to an example implementation. As shown in FIG. 9, DL user data flows from the gNB-CU to the source gNB-DU to the UE, while UL user data flows from the UE to the source gNB-DU to the gNB-CU. The UE is served by a source cell associated with the source gNB-DU.

At 901, the UE sends a measurement report to its serving (source) gNB-DU; the report includes L1 RSRP measurements of a target cell having the same CU-PCIG as the source cell.

At 902, the serving gNB-DU performs an intra-DU preparation including DL data buffering.

At 903, the serving gNB-DU sends a serving cell change command to the UE over a MAC CE connection.

At 904, The UE and serving gNB-DU perform a random access (RACH) procedure to establish a connection between the UE and the gNB-DU within the target cell. Once the serving cell change has been effected, the gNB-CU sends DL user data to the serving gNB-DU, which in turn sends the DL user data to the UE in the target cell. (The gNB-CU does not know which cell by which the UE is served, only its serving gNB-DU.) The UE sends UL user data to the gNB-CU.

To summarize, the following entities within a network are affected as follows:

gNB-DU:

gNB-DU informs the CU-CP of all its constituent Cell ID, cell DU-PCIs during F1 setup or Configuration update procedure. The gNB-DU in return receives the mapped CU-PCIG from the CU-CP.

gNB-DU takes care of mapping the CU-PCIG=>DU-PCI while sending or receiving any messages to/from CU-CP gNB-CU-CP:

The gNB-CU-CP sends this mapping between CU-PCIG⇔DU-PCI(s) during RRC Setup or Reconfiguration corresponding to Initial access/mobility/reconfiguration etc. scenarios to the UE via RRC protocol.

The UE is always configured both L3 measurements and L1 RSRP measurements by RRC, since both are needed to handle the different mobility events.

UE:

The UE receives the DU-PCI⇔CU-PCIG mapping from the gNB-CU-CP as part of the RRC configuration.

The UE stores the DU-PCI⇔CU-PCIG mapping and based on this, when performing measurements.

If the measured DU-PCI is mapped to the same CU-PCIG, L1 RSRP measurements (or possibly L3 RSRP measurements) are reported only to DU and the report to CU may be suppressed, which may lead to an intra-DU mobility event.

If measured cell PCI is mapped to a different CU-PCIG, L3 measurements are reported to CU-CP which may lead to an inter-DU mobility event.

It is noted that, after a measurement event is triggered and the concerned cell belongs to the same DU as serving cell, it is reported directly to DU (this would likely be done via L1/MAC and not RRC signalling. Moreover, L1 measurements on beams from another cell in the same DU may not be based on averaged measurements. When the concerned cell belongs to the same DU, L3 measurements may not be reported to CU. Even if they are reported, CU may not take any action towards UE based on them.

The handling of different use-cases are as follows.

Initial Access

UE performs initial access as currently using the cell DU-PCI.

CU-CP allocates the CU-PCIG corresponding to the UE's cell PCI (shared with DU during F1 setup or Configuration Update procedures).

CU-CP sends to UE during RRC Setup, the mapping between DU-PCIs and CU-PCIG.

UE stores this until it is further updated during an inter-DU cell change.

Measurement Configuration and Reporting.

UE is always configured both L3 measurements and L1 RSRP measurements by RRC.

UE performs measurements as usual. When measuring a target Cell, if L1 RSRP measurements on the Target cell are reported at MAC protocol at the DU, the DU may trigger an intra-DU cell change.

If target cell's DU-PCI has a different CU-PCIG, L3 measurements are reported to CU-CP.

CU-CP may trigger an inter-DU serving cell change based on reported L3 measurements.

Mobility

As in current situations, all DU level parameters are controlled by DU and the CU-CP is kept agnostic of the cell level aspects.

Likewise during any resource preparation for a Handover event

Figure 10:
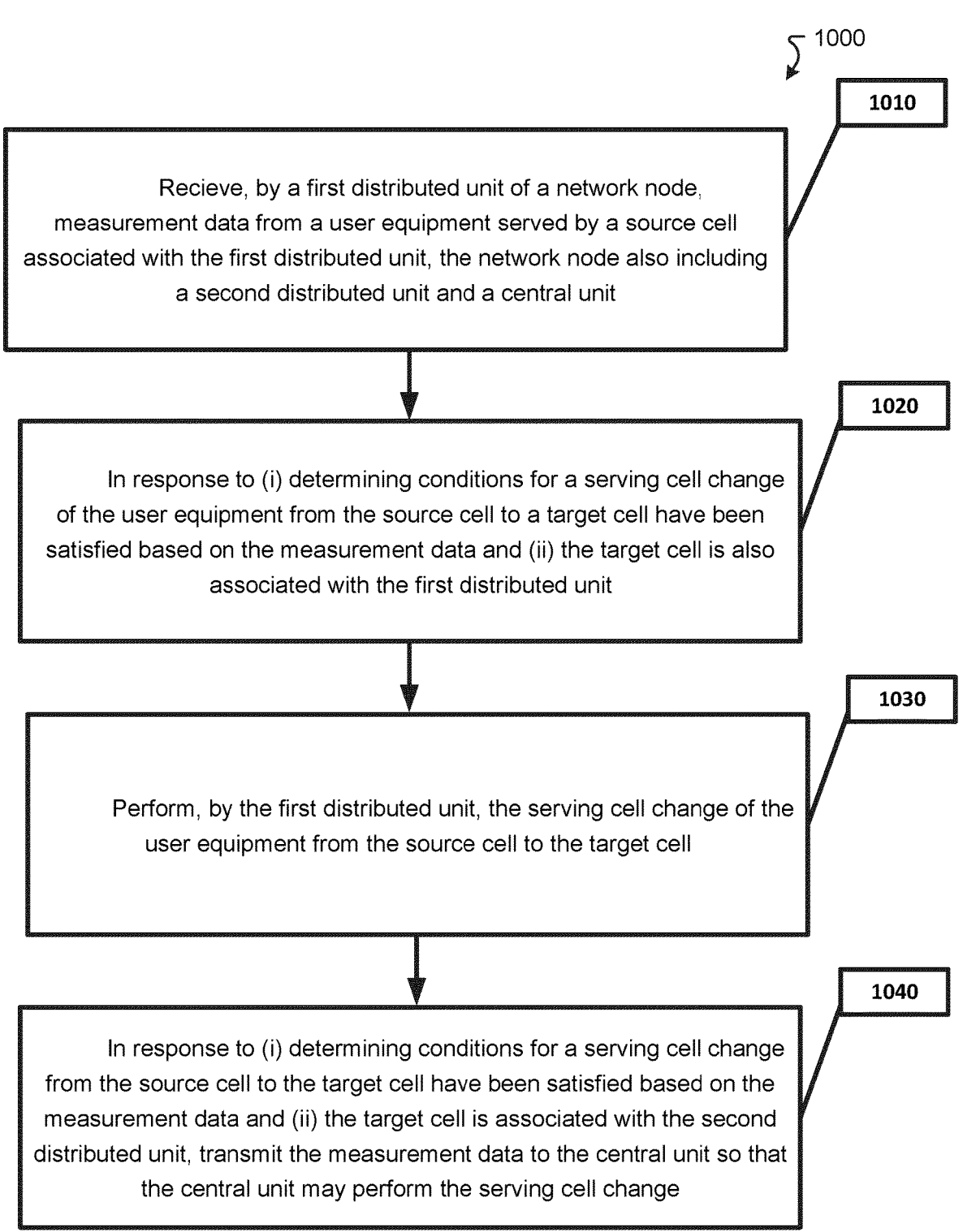
FIG. 10 is a flow chart illustrating a bi-layered mobility process according to an example implementation

Example 1-1: FIG. 10 is a flow chart illustrating an example method 1000 of performing intra and inter gNB-DU mobility. Operation 1010 includes receiving, by a first distributed unit (gNB-DU) of a network node (gNB), measurement data from a user equipment (UE) served by a source cell associated with the first gNB-DU, the gNB also including a central unit (gNB-CU) and a second gNB-DU. Operation 1020, includes in response to (i) determining conditions for a serving cell change of the UE from the source cell to a target cell have been satisfied based on the measurement data and (ii) the target cell is also associated with the first gNB-DU, performing, by the first gNB-DU, the serving cell change of the UE from the source cell to the target cell. Operation 1030, includes in response to (i) determining conditions for a serving cell change from the source cell to the target cell have been satisfied based on the measurement data and (ii) the target cell is associated with the second gNB-DU, transmitting, by the first gNB-DU, the measurement data to the gNB-CU so that the gNB-CU may perform the serving cell change.

Example 1-2: According to an example implementation of example 1-1, further comprising receiving, from the gNB-CU, mapping data representing a mapping between a plurality of physical cell identifiers (DU-PCIs) and a plurality of physical cell group identifiers (CU-PCIGs), each of the plurality of DU-PCIs identifying a respective cell of a plurality of cells associated with at least first and second gNB-DUs, each of the CU-PCIGs identifying a respective group of one or more cells from at least the first gNB-DU or the second gNB-DU, and determining whether the target cell is served by the first gNB-DU based on the mappings between (i) the DU-PCIs identifying the source cell and the target cell and (ii) the CU-PCIGs identifying the first gNB-DU and the second gNB-DU.

Example 1-3: According to an example implementation of example 1-2, further comprising transmitting, to the gNB-CU, cell data representing a plurality of DU-PCIs, and receiving, from the gNB-CU, the mapping data, the mapping data being based on the cell data.

Example 1-4: According to an example implementation of examples 1-2 and 1-3, wherein the mapping data is received during one of an F1 setup or a gNB-CU Configuration Update procedure.

Example 1-5: According to an example implementation of examples 1-1 to 1-4, wherein the measurement data includes L1 measurement data from layer 1 (L1) measurements of a reference signal received power (RSRP) and layer 3 (L3) measurement data from L3 measurements of the RSRP.

Example 1-6: According to an example implementation of examples 1-1 to 1-5, wherein the L1 measurement data is received via a MAC interface.

Example 1-7: According to an example implementation of examples 1-1 to 1-6, wherein, in response to the target cell being served by the second gNB-DU, transmit the L3 measurement data to the gNB-CU.

Example 1-8: According to an example implementation of example 1-7, wherein the L3 measurement data is transmitted to the gNB-CU via a radio resource control (RRC) connection.

Example 1-9: According to an example implementation of examples 1-5 to 1-8, wherein, in response to the target cell being served by the first gNB-DU, not transmit any portion of the measurement data to the gNB-CU.

Example 1-10: An apparatus comprising means for performing a method of any of examples 1-1 to 1-9.

Example 1-11: A computer program product including a non-transitory computer-readable storage medium and storing executable code that, when executed by at least one data processing apparatus, is configured to cause the at least one data processing apparatus to perform a method of any of examples 1-1 to 1-9.

Example 2-1: FIG. 11 is a flow chart illustrating a process 1100 of performing intra and inter gNB-DU mobility. Operation 1110 includes receiving, by a central unit (gNB-CU) of a network node (gNB) from a first distributed node (gNB-DU) and a second gNB-DU of the gNB, cell data representing a plurality of physical cell identifiers (DU-PCIs), the gNB also including a central unit (gNB-CU) and a second gNB-DU, the DU-PCIs identifying a plurality of cells associated with at least first and second gNB-DUs. Operation 1120 includes generating, by the gNB-CU, mapping data based on the cell data, the mapping data representing a mapping between the plurality of DU-PCIs and a plurality of physical cell group identifiers (CU-PCIGs), the CU-PCIGs identifying the first gNB-DU and the second gNB-DU. Operation 1130 includes transmitting, by the gNB-CU, the mapping data to the first gNB-DU and a user equipment (UE) served by a first cell of the plurality of cells, the first cell being associated with the first gNB-DU.

Example 2-2: According to an example implementation of example 2-1, wherein the mapping data is transmitted to the UE during a radio resource control (RRC) reconfiguration.

Example 2-3: According to an example implementation of examples 2-1 or 2-2, wherein the mapping data is transmitted to the first gNB-DU during an F1 setup.

Example 2-4: An apparatus comprising means for performing a method of any of examples 2-1 to 2-3.

Example 2-5: A computer program product including a non-transitory computer-readable storage medium and storing executable code that, when executed by at least one data processing apparatus, is configured to cause the at least one data processing apparatus to perform a method of any of examples 2-1 to 2-3.

Example 3-1: FIG. 12 is a flow chart illustrating a process 1200 of performing intra and inter gNB-DU mobility. Operation 1210 includes transmitting, to a first distributed unit (gNB-DU) of a network node (gNB) from a user equipment (UE), measurement data taken from a source cell serving the UE and a target cell, the source cell being associated with the first gNB-DU, the gNB also including a second gNB-DU and a central unit (gNB-CU). Operation 1220 includes, in response to the measurement data indicating a serving cell change to the target cell and the target cell is associated with the first gNB-DU, receiving a serving cell change command from the first gNB-DU. Operation 1230 includes, in response to the measurement data indicating a serving cell change to the target cell and the target cell is associated with the second gNB-DU, receiving a serving cell change command from the gNB-CU.

Example 3-2: According to an example implementation of example 3-1, further comprising receiving, from the gNB-CU, mapping data representing a mapping between a plurality of physical cell identifiers (DU-PCIs) and a plurality of physical cell group identifiers (CU-PCIGs), each of the plurality of DU-PCIs identifying a respective cell of a plurality of cells associated with at least first and second gNB-DUs, each of the CU-PCIGs identifying a respective group of one or more cells from at least the first gNB-DU or the second gNB-DU.

Example 3-3: According to an example implementation of example 3-2, wherein the mapping data is received during a radio resource control (RRC) reconfiguration.

Example 3-4: According to an example implementation of examples 3-1 to 3-3, wherein the measurement data includes L1 measurement data from layer 1 (L1) measurements of a reference signal received power (RSRP) and layer 3 (L3) measurement data from L3 measurements of the RSRP.

Example 3-5: According to an example implementation of example 3-4, wherein transmitting the measurement data includes, in response to the measurement data indicating a serving cell change to the target cell and the target cell is associated with the first gNB-DU, transmit the L1 measurement data to the first gNB-DU via a media access control (MAC) interface.

Example 3-6: According to an example implementation of example 3-4, wherein transmitting the measurement data includes, in response to the measurement data indicating a serving cell change to the target cell and the target cell is associated with the second gNB-DU transmit the L3 measurement data to the gNB-CU via a radio resource control (RRC) reconfiguration.

Example 3-7: An apparatus comprising means for performing a method of any of examples 3-1 to 3-6.

Example 3-8: A computer program product including a non-transitory computer-readable storage medium and storing executable code that, when executed by at least one data processing apparatus, is configured to cause the at least one data processing apparatus to perform a method of any of examples 3-1 to 3-6.

In summary:

CU-CP is only aware of the UE location at gNB-DU level.

The DU maintains and performs the mapping between DU-PCI and CU-PCIG towards the CU-CP and the UE.

Paging also works on a similar basis. CU-CP simply pages the gNB-DU(s) and gNB-DU pages the cell(s).

Data is sent to the UE via gNB-DU. gNB-DU in charge of routing to the right cell using the correct cell-PCI. Data tunnels over F1-U do not change during an intra-DU cell change.

During Intra DU Handover: DRB are retained,
no change of ciphering key,
continuity of SRBs,
PDCP and RLC buffers are not flushed and continue the transmission and reception,
RLC layer would re-send the lost packet in case of AM mode DRB.

C-RNTI application and usage remains unchanged (e.g. even if the L1/L2-centric mobility introduces multiple C-RNTIs, the bi-layered mobility doesn't alter their usage).

Serving cell definition: the UE still retains the same serving cell as before (with the DU-PCI defining the serving cell). There may be impacts to which events can be configured for this case (as the "serving cell" may not be the only cell that is needed for measurement event comparisons), but they are outside this IR.

RLF monitoring: As the UE retains the existing serving cell, RLF monitoring would follow the serving cell.

| List of example abbreviations: | |
|---|---|
| AP | Access Point |
| BWP | Bandwidth Part |
| C-RNTI | Cell RNTI |
| CSI | Channel state information |
| CSI-RS | CSI reference signal |
| D-MIMO | Distributed MIMO |
| DL | Downlink |
| DM-RS | Demodulation reference signal |
| gNB | 5G Base Station |
| MIMO | Multi-Input Multi-Output |
| NR | New Radio (5G) |
| PL | Path Loss |
| PRACH | Physical RACH |
| PDSCH | Physical downlink shared channel |
| PUSCH | Physical uplink shared channel |
| RACH | Random Access Channel |
| RAR | RACH Response |
| RNTI | Radio Network Temporary Identifier |

-continued

List of example abbreviations:

| | |
|---|---|
| RS | Reference Signal |
| RSRP | Reference Signal Received Power |
| Rx | Receive |
| Rx-Tx | Receive-Transmit |
| SFN | Single Frequency Network |
| SSB | Synchronization Signal Block |
| TRP | Transmission/Reception Point |
| Tx | Transmit |
| UE | User Equipment |
| UL | Uplink |

FIG. 13 is a block diagram of a wireless station (e.g., AP, BS, e/gNB, NB-IoT UE, UE or user device) 1300 according to an example implementation. The wireless station 1300 may include, for example, one or multiple RF (radio frequency) or wireless transceivers 1302A, 1302B, where each wireless transceiver includes a transmitter to transmit signals (or data) and a receiver to receive signals (or data). The wireless station also includes a processor or control unit/ entity (controller) 1304 to execute instructions or software and control transmission and receptions of signals, and a memory 1306 to store data and/or instructions.

Processor 1304 may also make decisions or determinations, generate slots, subframes, packets or messages for transmission, decode received slots, subframes, packets or messages for further processing, and other tasks or functions described herein. Processor 1304, which may be a baseband processor, for example, may generate messages, packets, frames or other signals for transmission via wireless transceiver 1302 (1302A or 1302B). Processor 1304 may control transmission of signals or messages over a wireless network, and may control the reception of signals or messages, etc., via a wireless network (e.g., after being down-converted by wireless transceiver 1302, for example). Processor 1304 may be programmable and capable of executing software or other instructions stored in memory or on other computer media to perform the various tasks and functions described above, such as one or more of the tasks or methods described above. Processor 1304 may be (or may include), for example, hardware, programmable logic, a programmable processor that executes software or firmware, and/or any combination of these. Using other terminology, processor 1304 and transceiver 1302 together may be considered as a wireless transmitter/receiver system, for example.

In addition, referring to FIG. 13, a controller (or processor) 1308 may execute software and instructions, and may provide overall control for the station 1300, and may provide control for other systems not shown in FIG. 13 such as controlling input/output devices (e.g., display, keypad), and/ or may execute software for one or more applications that may be provided on wireless station 1300, such as, for example, an email program, audio/video applications, a word processor, a Voice over IP application, or other application or software.

In addition, a storage medium may be provided that includes stored instructions, which when executed by a controller or processor may result in the processor 1304, or other controller or processor, performing one or more of the functions or tasks described above.

According to another example implementation, RF or wireless transceiver(s) 1302A/1302B may receive signals or data and/or transmit or send signals or data. Processor 1304 (and possibly transceivers 1302A/1302B) may control the RF or wireless transceiver 1302A or 1302B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall as intended in the various embodiments.

What is claimed is:

1. An apparatus, comprising:
at least one processor; and
at least one memory including computer program code;
the at least one memory and the computer program code configured to cause the apparatus at least to:
receive, by a first distributed unit of a network node, measurement data from a user equipment served by a source cell associated with the first distributed unit, the network node also including a second distributed unit and a central unit;
in response to (i) determining conditions for a serving cell change of the user equipment from the source cell to a target cell have been satisfied based on the measurement data and (ii) the target cell is also associated with the first distributed unit, perform, by the first distributed unit, the serving cell change of the user equipment from the source cell to the target cell; and
in response to (i) determining conditions for a serving cell change from the source cell to the target cell have been satisfied based on the measurement data and (ii) the target cell is associated with the second distributed unit, transmit the measurement data to the central unit so that the central unit may perform the serving cell change.

2. The apparatus as in claim 1, wherein the at least one memory and the computer program code are further configured to cause the apparatus at least to:
receive, from the central unit, mapping data representing a mapping between a plurality of physical cell identifiers and a plurality of physical cell group identifiers, each of the plurality of physical cell identifiers identifying a respective cell of a plurality of cells associated with at least first and second distributed units, each of the physical cell group identifiers identifying a respective group of one or more cells from at least the first distributed unit or the second distributed unit, and
determine whether the target cell is served by the first distributed unit based on the mappings between (i) the physical cell identifiers identifying the source cell and the target cell and (ii) the physical cell group identifiers identifying the first distributed unit and the second distributed unit.

3. The apparatus as in claim 2, wherein the at least one memory and the computer program code are further configured to cause the apparatus at least to:
transmit, to the central unit, cell data representing a plurality of physical cell identifiers; and
receive, from the central unit, the mapping data, the mapping data being based on the cell data.

4. The apparatus as in claim 2, wherein the mapping data is received during one of an F1 setup or a central unit configuration update procedure.

5. The apparatus as in claim 1, wherein the measurement data includes layer 1 measurement data from layer 1 measurements of a reference signal received power and layer 3 measurement data from layer 3 measurements of the reference signal received power.

6. The apparatus as in claim 5, wherein the layer 1 measurement data is received via a media access control interface.

7. The apparatus as in claim 5, wherein, in response to the target cell being served by the second distributed unit, transmit the layer 3 measurement data to the central unit.

8. The apparatus as in claim 7, wherein the layer 3 measurement data is transmitted to the central unit via a radio resource control protocol.

9. The apparatus as in claim 5, wherein, in response to the target cell being served by the first distributed unit, not transmit any portion of the measurement data to the central unit.

10. An apparatus, comprising:
at least one processor; and
at least one memory including computer program code;
the at least one memory and the computer program code configured to cause the apparatus at least to:
transmit, to a first distributed unit of a network node from a user equipment, measurement data taken from a source cell serving the user equipment and a target cell, the source cell being associated with the first distributed unit, the network node also including a second distributed unit and a central unit;
in response to the measurement data indicating a serving cell change to the target cell and the target cell is associated with the first distributed unit, receive a serving cell change command from the first distributed unit; and
in response to the measurement data indicating a serving cell change to the target cell and the target cell is associated with the second distributed unit, receive a serving cell change command from the central unit.

11. The apparatus as in claim 10, wherein the at least one memory and the computer program code are further configured to cause the apparatus at least to:
receive, from the central unit, mapping data representing a mapping between a plurality of physical cell identifiers and a plurality of physical cell group identifiers, each of the plurality of physical cell identifiers identifying a respective cell of a plurality of cells associated with at least first and second distributed units, each of the physical cell group identifiers identifying a respective group of one or more cells from at least the first distributed unit or the second distributed unit.

12. The apparatus as in claim 11, wherein the mapping data is received during a radio resource control reconfiguration.

13. The apparatus as in claim 10, wherein the measurement data includes layer 1 measurement data from layer 1 measurements of a reference signal received power and layer 3 measurement data from layer 3 measurements of the reference signal received power.

14. The apparatus as in claim 13, wherein the at least one memory and the computer program code configured to transmit the measurement data is further configured to cause the apparatus at least to:
in response to the measurement data indicating a serving cell change to the target cell and the target cell is associated with the first distributed unit, transmit the layer 1 measurement data to the first distributed unit via a media access control interface.

15. The apparatus as in claim 13, wherein the at least one memory and the computer program code configured to transmit the measurement data is further configured to cause the apparatus at least to:
in response to the measurement data indicating a serving cell change to the target cell and the target cell is associated with the second distributed unit transmit the layer 3 measurement data to the central unit via a radio resource control reconfiguration procedure.

\* \* \* \* \*